A. SUNDH.
DIFFERENTIAL POWER TRANSMISSION MECHANISM.
APPLICATION FILED APR. 3, 1909.

1,099,472.

Patented June 9, 1914.
6 SHEETS—SHEET 1.

Witnesses:
James G. Bithell
J. F. Rule

Inventor:
August Sundh
By L. H. Campbell
Attorney

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

DIFFERENTIAL-POWER-TRANSMISSION MECHANISM.

1,099,472.  Specification of Letters Patent.  Patented June 9, 1914.

Application filed April 3, 1909. Serial No. 487,701.

*To all whom it may concern:*

Be it known that I, AUGUST SUNDH, a citizen of the United States, residing at Yonkers, in the county of Westchester and State of New York, have invented a new and useful Improvement in Differential-Power-Transmission Mechanism, of which the following is a specification.

My invention relates to power transmission and controlling mechanism, and more particularly to hydraulic power transmission devices and electro-mechanical means for regulating and controlling the same.

In general, the invention comprises a prime mover, two separate pumps operated thereby, two separate motors operated by fluid pressure supplied by the pumps, and mechanism for regulating and controlling the absolute and relative speed of the motors, and also their direction of operation.

One of the objects of the present invention is to provide means of the above described character in which the motors may be regulated and controlled to operate either in the same direction and at the same speed, or differentially at any desired relative speeds; or in which one of the motors alone may be operated at any desired speed, or in which the motors may be operated in opposite directions either at the same or different speeds. The motors may be used to operate various mechanisms, as for example, twin screw propellers for a boat, differential mechanism for operating the rudder of a boat or for operating other steering apparatus, traction sheaves for operating hoisting apparatus, and various other devices adapted to be operated by differential driving mechanism.

Other objects of the invention will appear hereinafter in connection with a more detailed description thereof.

The scope of the invention is defined in the appended claims in which are set forth the novel combinations of elements.

In the accompanying drawings which illustrate a construction embodying my invention, as adapted for use in the operation and control of a boat, Fig. 10 is general plan view of a construction embodying the present invention as applied to operate a boat having twin screw propellers; Fig. 11 is an elevation view partly in section of the manually operable controlling mechanism; Fig. 11$^a$ is a detail view of parts shown in Fig. 11; Fig. 12 is a sectional elevation view of one of the controllers shown in Fig. 11; Fig. 13 is a detail view of a controlling lever shown in Fig. 11.

Figures 10, 11, 11A, 12, 13:
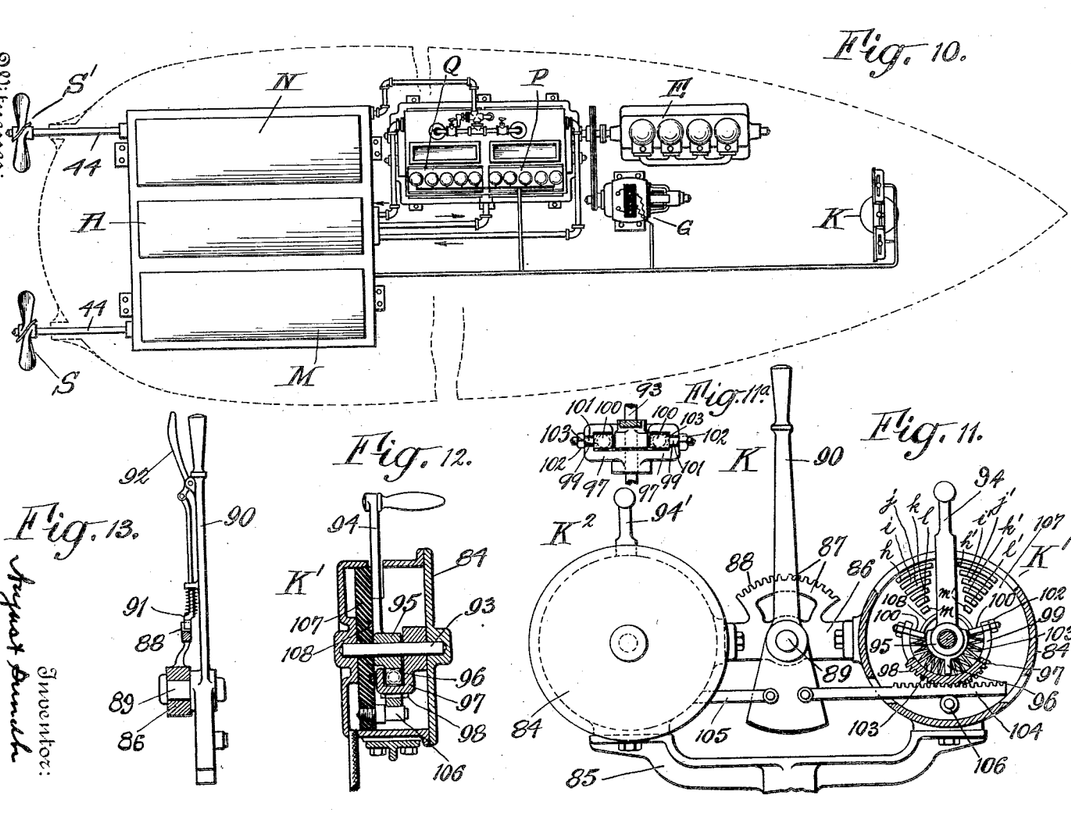

The general arrangement of the invention as shown in Fig. 10 comprises a prime mover E which as here shown is an internal combustion engine connected to drive a pair of pumps P and Q. These pumps supply liquid under pressure to operate motors N and M connected to drive the screw propellers S and S'. The generator G connected to be driven by the engine E supplies current for energizing electro-magnets used to control the speed and direction of operation of the motors, as fully set forth hereinafter. A manual controlling device K is used to control the supply of current to the various electro-magnets.

Figures 4, 8, 9:
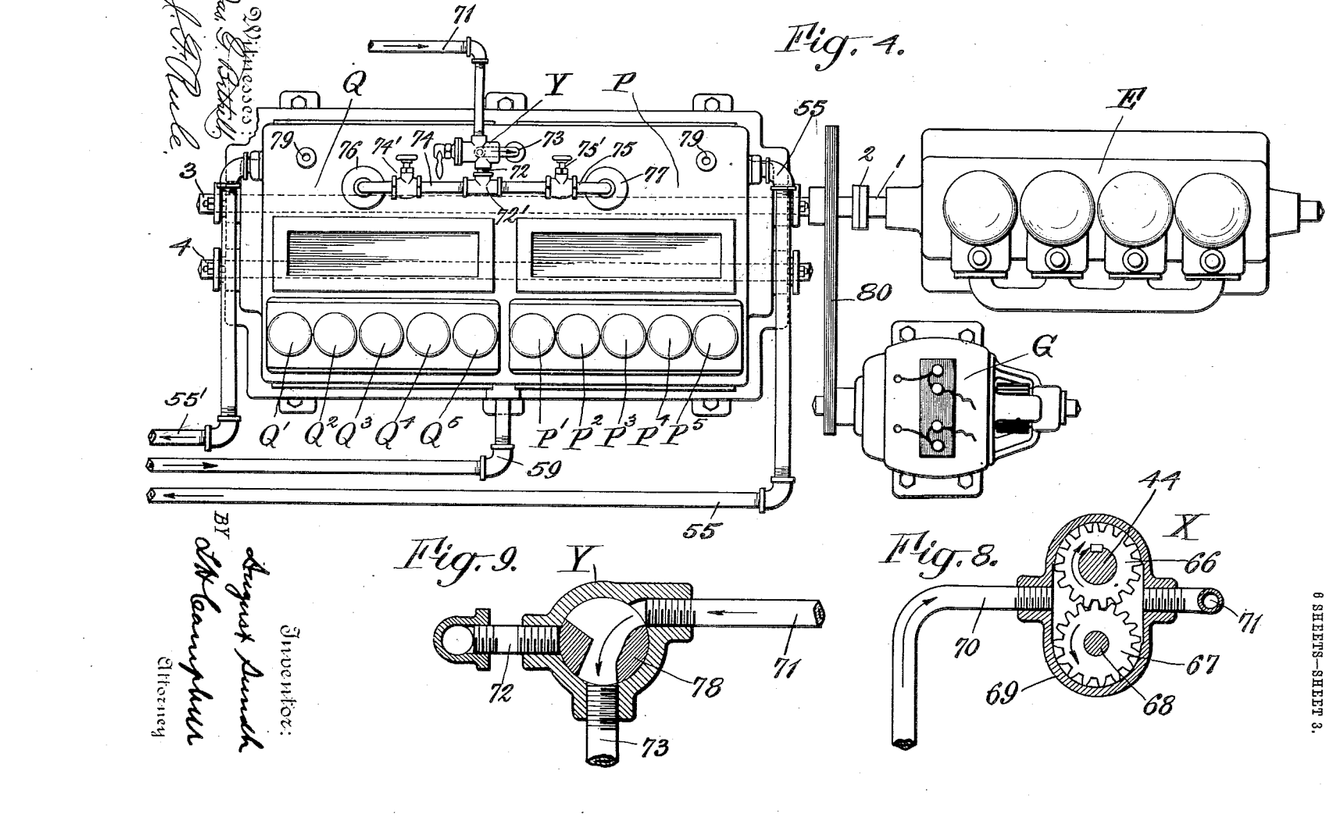
Fig. 4 is a plan view of the prime mover, pumps, and an electrical generator.
Fig. 8 is a detail view of an auxiliary pump.
Fig. 9 is a detail view of a three-way valve.
Figures 5, 6:
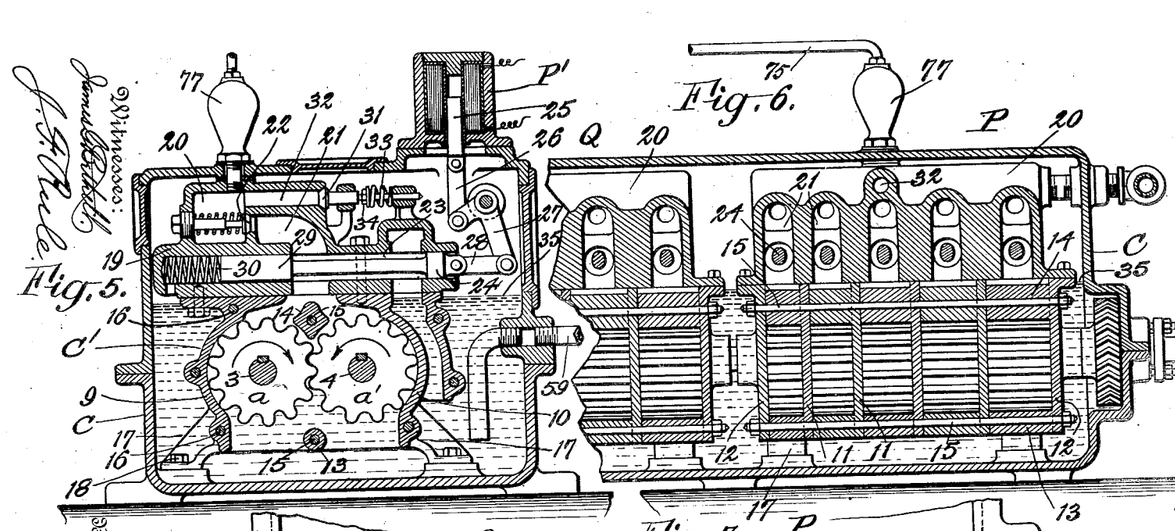
Fig. 5 is a sectional elevation showing one of the pumps and associated valve mechanism.
Fig. 6 is a longitudinal sectional elevation showing a portion of the pumps.
Figure 7:
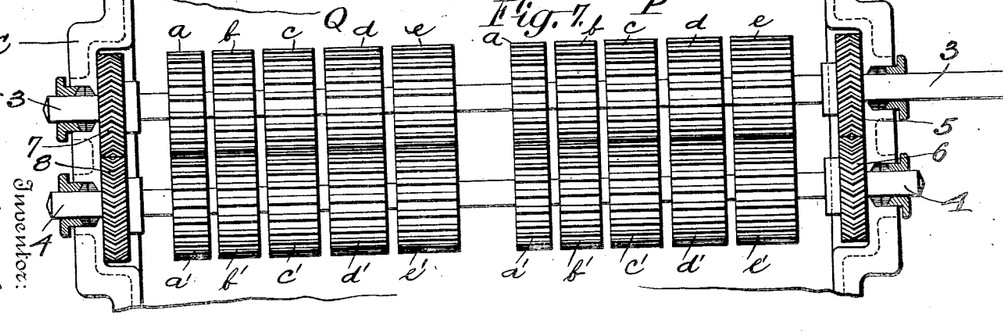
Fig. 7 is a plan view of the pump gears and the driving gears therefor.

The construction and operation of the pumps will be understood from a consideration of Figs. 4, 5, 6 and 7. The two pumps P and Q are preferably substantially similar in construction, and each comprises a plurality of pairs of pump gears $a\ a'$, $b\ b'$, $c\ c'$, $d\ d'$, $e\ e'$. The shaft 1 of the engine is connected by a coupling 2 to the drive shaft 3 of the pumps. A shaft 4 parallel to the shaft 3 is geared thereto by means of herring-bone tooth gears 5, 6, 7 and 8 keyed to the shafts 3 and 4. The pump gears, $a$, $b$, $c$, $d$ and $e$ of both pumps are keyed to the shaft 3; the gears $a'$, $b'$, $c'$, $d'$ and $e'$ are likewise keyed to the shaft 4. The pumps P and Q are both located in a casing C. An inner casing C' is provided for each pump and comprises side walls 9 and 10 curved to conform to the peripheries of the pump gears. These side walls 9 and 10 are made in sections spaced apart by partitions 11. The side walls 9 and 10 together with the partitions 11 and end walls 12 form separate compartments for the several pairs of pump gears, $a$ $a'$, etc. The several sections of the pump are clamped by means of rods 16 extending through the side walls and partitions. Additional clamping rods or bolts 15 are also provided and have mounted thereon spacing sleeves 13 and 14 located between the partitions and end walls 11 and 12. The pump casings are provided with brackets 17 and are rigidly secured within the outer casing C' by means of bolts 18. Located over each casing C' and bolted thereto, is a casting 19 which comprises a pressure chamber 20 extending longitudinally of the pump. Associated with each pair of pump gears are valves and passages controlling the flow of liquid from the pump gears to the pressure chamber and also from the pump gears directly back to the supply chamber. As this valve mechanism for each section is substantially the same, a description of said mechanism for one section of the pump as shown in Fig. 5 will suffice for all, and is as follows:—A passage 21 extends from the gear casing to the pressure chamber 20 and a spring pressed check valve 22 permits a flow of liquid into the pressure chamber but prevents liquid from flowing back toward the pump. A horizontal passage 23 extending from the passage 21 forms a by-pass permitting the liquid to flow from the pressure side of the pump gears directly back into the chamber or casing C. This by-pass is controlled by a valve 24 adapted to be operated by an electro-magnet P'. The core 25 of the electro-magnet is connected by a link 26 with one arm of a bell-crank lever 27; the other arm of the bell-crank lever is connected by a link 28 to the valve 24. When the magnet is deënergized, the parts assume the position shown in the drawings, the passage 23 being open. When the electro-magnet P' is excited, its core 25 is drawn upward and operates through the bell-crank lever to move the valve 24 to the left and thereby close the passage 23. The left-hand end of the valve 24 has a cylindrical portion 29 slidable in a correspondingly shaped recess formed in the casting 19. A coil spring 30 located in the part 29 insures the return of the valve 24 to open position when the electro-magnet is deënergized. The weight of the core 25, however, and the link 26, may be sufficient to open the valve without the use of a spring.

A relief valve 31 controls a passage 32 extending from the pressure chamber 20 to the supply chamber. This valve is normally held in its seat by a heavy coil spring 33 which permits the valve to open whenever the pressure in the chamber 20 becomes excessive. The pressure at which the valve operates may be varied by adjusting the nut 34. It will be understood that a single relief valve suffices for each pressure chamber. Each pump is provided with electro-magnets as $P'$, $P^2$, $P^3$, $P^4$ and $P^5$; each magnet controlling a valve 24 for one section of the pump. Assuming these magnets to be deënergized, the operation of the pumps is substantially as follows:—The engine E rotates the shaft 3 through the gears 5, 6 and 7, 8 and positively drives the shaft 4. The pump gears are thus rotated in the directions indicated by the arrows in Fig. 5. It should be here noted that the teeth of the pump gears are rounded so that their ends are substantially semi-circular. The teeth for each pair of gears can therefore roll on each other but are so shaped as to prevent the liquid from being entrapped or locked between the teeth, which would prevent the proper operation of the pump gears. The gear wheels 5, 6 and 7, 8 serve to drive the shaft 4 at the same speed as the shaft 3, and by preventing any independent rotation of said shafts, serve to hold the interlocking pump gears accurately in mesh, thereby preventing leakage, friction losses and wear of the gear teeth. A smooth and regular movement of the pump gears is also effected which cannot be obtained without the use of the gears 5, 6 and 7, 8, or equivalent devices in addition to the pump gears for preventing independent movement of the shafts. The particular form of pump gears and driving gears on the shafts 3 and 4 are shown and claimed in my co-pending application for improvement in gear pumps, Serial No. 538,428, filed Jan. 17, 1910. As the gears rotate, the liquid is carried from the supply chamber upward between the side walls 9 and 10 and the pump gears, and flows back through the passage 23 into the supply chamber. As there is practically no resistance to the circulation of the liquid, the pumps run free and only a small amount of power is consumed to operate them. If now the magnet P' is energized its valve 24 is closed as before described, and the liquid circulated by the gears $a$ $a'$ is forced through the passage 21 and past the check valve 22 into the pressure chamber; from the latter the liquid can flow to one of the motors, as will be fully described later. When the second magnet $P^2$ is energized, the second set of pump gears, $b$, $b'$, also operate to pump liquid into the pressure chamber, thereby increasing the volume of liquid delivered by the pump. As each succeeding magnet is energized, the corresponding section of the pump operates to force liquid into the pressure chamber, thereby increasing the total output of the pump.

The circulating liquid 35 may be either water, oil, or some other liquid, but is preferably light oil which has certain advantages over water and other liquids, as it will not evaporate, will not freeze in cold weather, and serves to keep the mechanism well lubricated.

Figure 1:
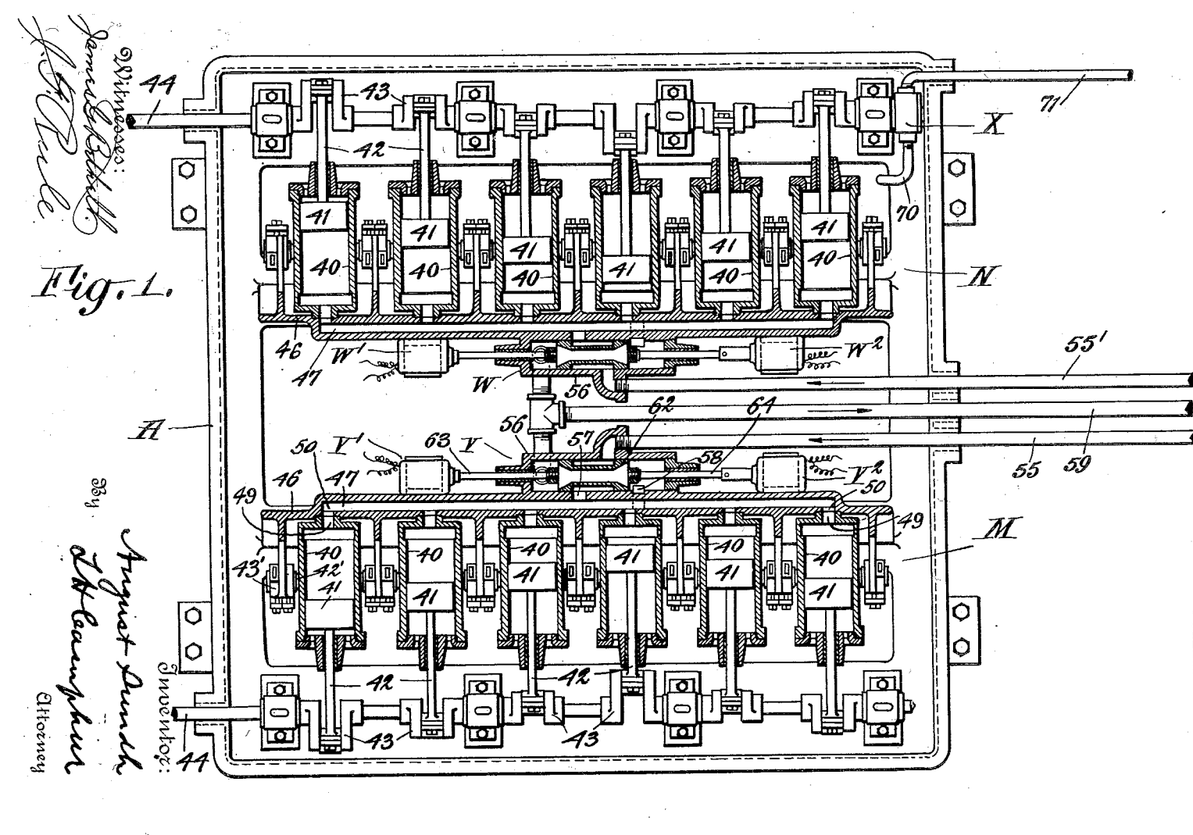
Figure 1 is a sectional plan view of the fluid operated motors.
Figures 2, 3:
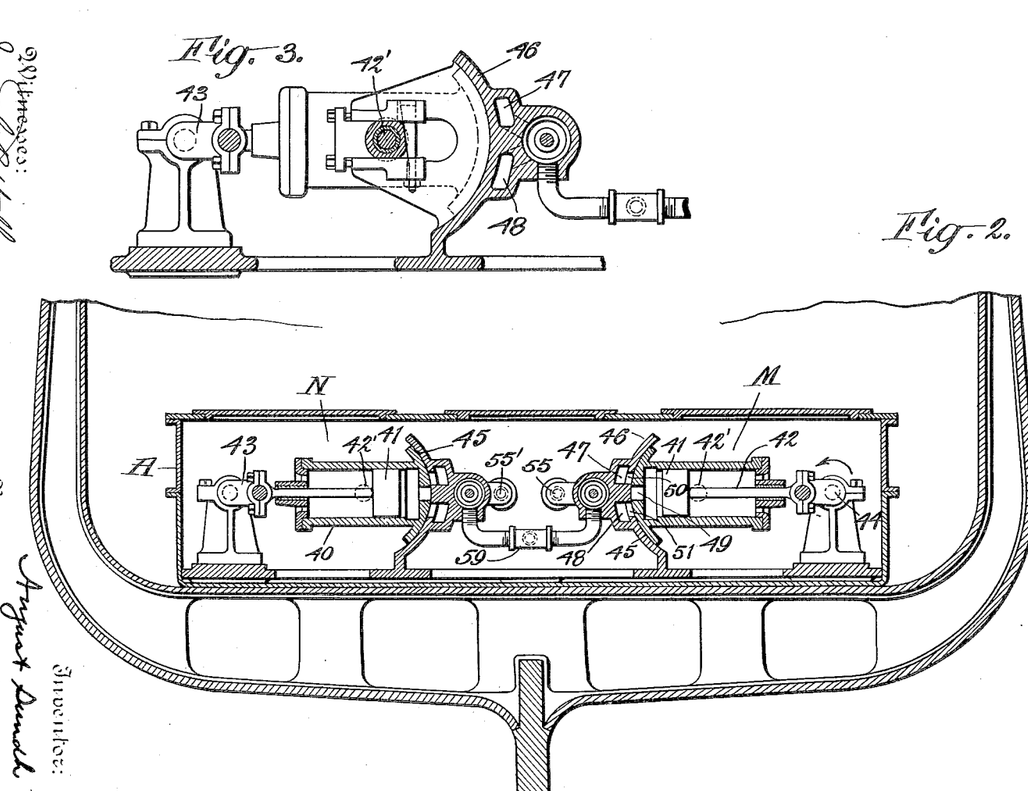
Fig. 2 is a sectional elevation of the same and also showing a section of a boat in which the mechanism is located.
Fig. 3 is a detail view on a larger scale of a motor cylinder and associated parts.

The fluid operated motors as illustrated in Figs. 1, 2 and 3 will now be described. The two motors N and M are substantially alike in construction; each motor comprises six cylinders 40 provided with trunnions 42' mounted in bearings 43', thereby permitting the cylinders to oscillate. In each cylinder is a reciprocating piston 41 connected by a piston rod 42 to a crank 43 on a propeller shaft 44. The cranks 43 on each shaft 44 are placed at different angles and are preferably each 60 degrees in advance of the preceding crank, so as to secure a practically constant driving power or torque of the shaft 44 as the motors operate. The inner end of each motor cylinder has an arc shaped bearing surface 45 concentric with its pivot or trunnions 42' and coöperating with a correspondingly shaped bearing surface formed on a stationary member 46. A member 46 is provided for each motor and extends longitudinally thereof, as indicated in Fig. 1. The members 46 are preferably castings formed with longitudinal passages 47 and 48. The inner end of each motor cylinder is formed with a port 49 adapted to be brought into communication with ports 50 and 51 opening into the passages 47 and 48, respectively.

The flow of liquid to and from the motors M and N is controlled by reversing valves V and W, respectively. With the reversing valves in the position shown in Fig. 1, the circulating liquid is conveyed from the pressure chamber 20 of the pump P through a pipe 55, through the valve chamber 56 of the valve V and through a port 57 into the upper passage 47 of the casting 46, and from the passage 47 through the ports 50 into the motor cylinders. From the motor cylinders, the liquid is discharged through the ports 51 into the lower passage 48 and from thence flows through a passage 58 into the valve chamber 56 and back through a common return pipe 59 into the casing C, which forms a common supply chamber for the two pumps P and Q. The liquid from the pressure chamber of the pump Q is likewise conveyed through a pipe 55' to the valve casing 56 of the reversing valve W, and from thence is circulated through the motor cylinders of the motor N in the same manner as the liquid is circulated through the pump M, and then returns from the motor N through the common return pipe 59 to the supply chamber.

The way in which the liquid operates the motors will be readily understood from a consideration of Fig. 2. This figure shows a motor cylinder for the motor M with a piston 41 in its innermost position. The port 49 is cut off from communication with either passage 47 or 48; the shaft 44 is rotating in a counter-clockwise direction, as indicated by the arrow. This movement of the shaft rotates the motor cylinder about its pivot 42' and opens the port 49 to the passage 47 which is in communication with the pressure chamber of the pump P. The liquid therefore, is forced into the motor cylinder and drives the piston toward the outer end of the cylinder, the power transmitted from the piston operating to drive the shaft 44. By the time the piston has reached its outermost position, the inner end of the cylinder has been swung upward and again returned to central position, thus closing the supply port 50. The continued rotation of the shaft 44 swings the inner end of the cylinder downward below a central position and opens the port 49 through the port 51 to the exhaust passage 48, thereby permitting the liquid in the cylinder to be forced back into the exhaust chamber C as the piston moves inward. The action of each section of the motor M is the same, but it will be noted that with the cranks of the shaft 44 arranged at different angles, three of the motor pistons will be moving outward and driving the shaft 44, while the other three are returning so that a constant driving power is exerted on the shaft 44. The motor N operates in the same manner as the motor M.

The construction and operation of the reversing valves is substantially as follows: The valve V for example, comprises a valve chamber 56 in which is adapted to reciprocate, a hollow cylindrical valve member 62; this valve member is operated by electromagnets V' and V² whose cores are connected to the valve member 62 by rods 63 and 64, respectively. The valve is in the position shown when the electro-margnet V' is excited. With the valve in this position, the liquid from the pressure pipe 55 flows through the valve casing around the valve member 62 and through the port 57 into the passage 47, and after circulating through the motor cylinders is returned through the passage 58 and flows through the hollow valve member and into the return pipe 59. It will be observed that this valve is perfectly balanced so that after it has been brought into the position shown by the operation of the magnet V' it will remain in such position until moved by the magnet V². When the latter is excited, the valve member 62 is moved to its right-hand position, thereby cutting off communication between the pressure pipe 55 and the port 57, and at the same time connecting the pressure pipe with the passage 58. The port 57 is also opened to the return pipe 59. This movement of the valve to the right connects the passage 47 with the return pipe, and the passage 48 with the pressure pipe, and thereby causes the motor to operate in the reverse direction. The reversing valve W is operated in like manner by the electro-magnets W' and W² and controls the direction of rotation for the shaft of the motor N.

As the motors V and W are all inclosed in the casing A which is liquid tight, there is no loss of the liquid which escapes by leakage from the pumps. In order to return into the circulating system the liquid that thus leaks into the casing A, the following means is provided:—A small auxiliary pump X, as shown in Figs. 1 and 8, is connected to be driven by the motor N. This pump comprises a pair of intermeshing gears 66 and 67 connected to the shaft 44 and an idler shaft 58, respectively. These gears are inclosed in a casing 69. The intake pipe 70 for the pump extends downward to a point near the bottom of the casing A. The pipe 71 leading from the pressure side of the pump X extends to a three-way valve Y (Figs. 4 and 9). The valve Y has two outlet pipes 72 and 73; the pipe 73 extends through the top of the pump casing and therefore communicates with the supply chamber for the pumps; the pipe 72 is connected by a T joint 72' with pipes 74 and 75 which open into air chambers or domes 76 and 77 communicating with the pressure chambers of the pumps Q and P respectively. The valves 75' and 74' may be provided to control the flow of liquid through the pipes 75 and 74, respectively. The rotary valve member 78 for the valve Y is normally in the position shown in Fig. 9, so that the pipe 71 communicates with the pipe 73, but may be rotated into position to open the pipe 72 to the pipe 71 and cut off the pipe 73. During the normal operation of the motors M and N, the auxiliary pump X operates continuously so that any liquid that leakes from the motors into the casing A is drawn through the pipe 70 and pumped through the pipe 71, valve Y, and pipe 73, into the supply chamber for the main pumps. As the leakage will ordinarily be much less than the capacity of the auxiliary pump X, air will be pumped into the supply chamber C, but escapes immediately through openings 79 in the top of the pump casing. The air chambers 76 and 77 are normally filled or partly filled with air, which serves as a cushioning device preventing any sudden changes in the pressure of the liquid and securing a smooth operation of the motors. Whenever the amount of air in the air chambers is insufficient, owing to leakage or other causes, the auxiliary pump X may be used to replenish the air supply by turning the three-way valve so that the air is pumped through the pipes 74 and 75. By closing either the valve 75' or 74', air may be pumped into either one of the air chambers as needed.

It will be observed that by the use of reciprocating motor cylinders as herein shown, the usual packings required for fluid motors, are dispensed with, and also that a certain amount of leakage is not objectionable, as the pump X immediately returns the liquid into circulation. The friction of the moving parts may therefore be reduced to a minimum, as the packings and close fitting of bearing surfaces, which would otherwise be required, is not necessary, a high efficiency may therefore be obtained.

Figure 14:
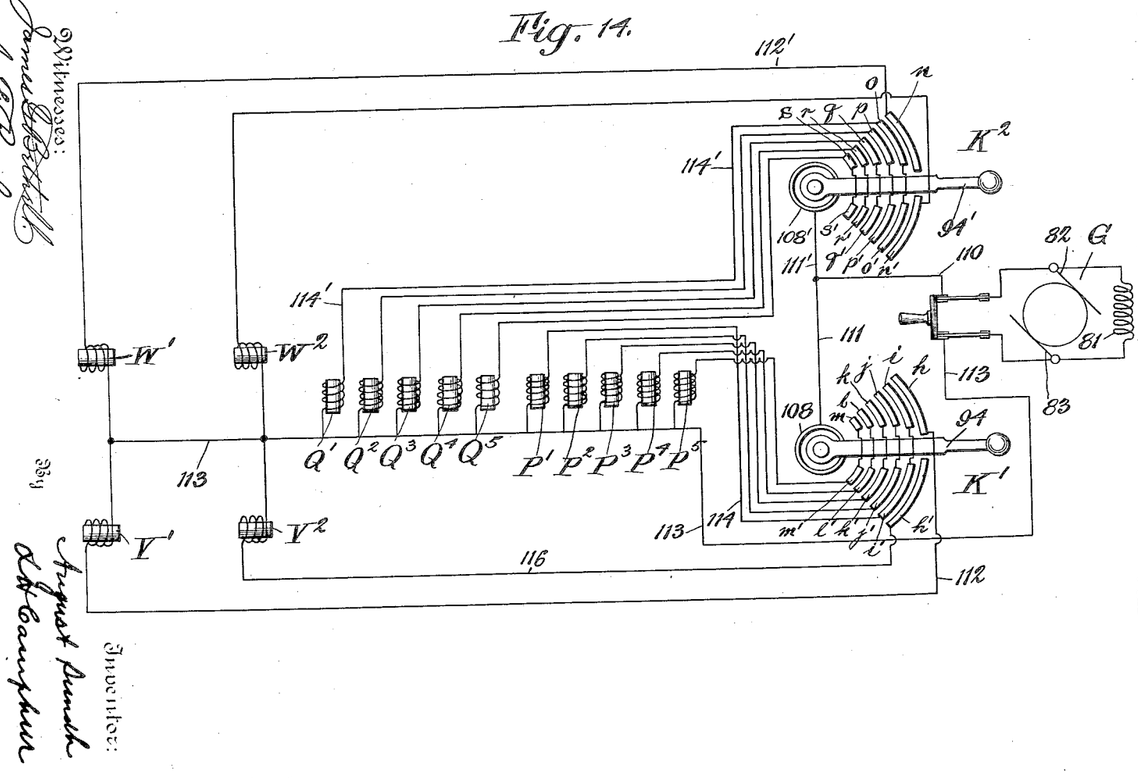
Fig. 14 is a diagrammatic view showing the controlling mechanism and electrical circuits therefor.

Electric current for operating the various electro-magnets is preferably supplied by means of a generator G which is connected by a belt 80, or any other suitable form of gearing to be driven from the engine E. This generator, as indicated in Fig. 14 may be a direct current shunt dynamo having shunt field winding 81 connected across commutator brushes 82 and 83. The manually operable controlling mechanism K by means of which the electrical circuits are controlled, is illustrated in Figs. 11, 11ª, 12 and 13. This mechanism comprises two controllers K' and K², which are substantially alike in construction; each controller comprises a circular casing 84; these casings being bolted to a bracket or support 85. Between these casings and bolted thereto, is a bracket 86 formed with a segment 87 having rack teeth 88. An operating lever 90 is pivoted at 89 to the bracket 86. A latch 91 carried by the lever 90 and adapted to be lifted by the hand lever 92, coöperates with the rack teeth 88 and serves to hold the lever 90 in any desired position. Within each controller box 84 is a pivot pin 93 on which is mounted a hand lever 94 having a hub 95 formed with an extension 96. Also mounted on the pivot pin 93 is an arc shaped member 97 provided with rack teeth 98. The part 97 is substantially U shaped in cross section, as indicated in Fig. 12, and forms a passage in which the extension 96 is adapted to move, the parts 95 and 97 being independently rotatable. The ends of the arc shaped member 97 are bifurcated or formed with slots 99. Stops 100 having stems 101 extending through the slots 99 are adjustable longitudinally of said slots and held in adjusted position by clamping nuts 102. Coil springs 103 are placed between the extension 96 and the stops 100 and act as centering springs to hold the lever 94 normally in central position in respect to the arc shaped member 97. Rack bars 104 and 105 are pivoted to the lever 90 and are provided with rack teeth meshing with the teeth 98. These rack bars are held in position and guided by anti-friction rollers 106. Within the casing 84 for the controller K' is a disk 107 formed of insulating material and located directly behind the lever 94. A contact ring 108 is set in the disk 107 and is at all times in electrical contact with the lever 94. The disk 107 also carries a series of arc shaped contacts $h, i, j, k, l, m$, adapted to be engaged successively by the lever 94 as it is moved to the left from a central position, and a corresponding series of contacts, $h', i', j', k', l', m'$ adapted to be engaged successively as the lever is moved to the right. The controller K² has similar series of contacts, $n, o, p, q, r, s$, etc., adapted to be engaged by the lever 94'.

The system of electrical circuits is illustrated diagrammatically in Fig. 14, and the operation of the controlling mechanism will be understood in connection with a general statement of the operation of the invention. Assuming the engine E to be running at a normal speed and the controlling mechanism in the position indicated by Fig. 11, the pumps P and Q will be operated, but as all of the valves 24 are open, the liquid will be circulated within the pump casing, and no pressure will be transmitted to the motors; the motors therefore will be at rest. If now, the controlling lever 90 is moved, for example, to the left as viewed in Fig. 11, a corresponding movement will be imparted through the rack bars 104 and 105, the arc shaped members 97, stops 100 and springs 103, to the levers 94 and 94'. The initial movement of the lever 94 brings it into engagement with the contact $h$, and completes a circuit through the magnet winding for the reversing valve-magnet V'; this circuit may be traced from the brush 82 of the generator, through conductors 110, 111, contact ring 108, switch lever 94, contact $h$, conductor 112, magnet winding of the electro-magnet V' and through the common return wire 113 to the brush 83. As the generator G is running whenever the engine E is in operation, the electro-magnet V' receives current and moves the reversing valve V into the position shown in Fig. 1 if it is not already in such position. The lever 94' likewise engages the contact $n$ and establishes a circuit which may be traced from the brush 82, through the conductors 110, 111', contact ring 108', switch lever 94', contact $n$, conductor 112', winding of electro-magnet W' and through the common return wire 113 to the brush 83; electro-magnet W' operates to place the reversing valve W in the position shown in Fig. 1. The continued movement of the lever 94 brings it into engagement with the contact $i$ and completes a circuit which may be traced from the brush 82 to the lever 94 and through contacts $i, i'$, conductor 114, winding of electro-magnet P', return wire 113 to the brush 83; the electro-magnet P' therefore operates to close the corresponding valve 24 (see Fig. 5) so that the first set of pump gears $a, a'$ will force liquid into the pressure chamber 20, from which it is transmitted to the motor M to operate the latter and rotate the propeller S. The lever 94' which moves in unison with the lever 94 engages the contact $o$ and completes a circuit which may be traced from the brush 82 to the lever 94', through contact $o$, conductor 114', winding of electro-magnet Q', and through the common return wire 113. The electro-magnet Q' operates its valve 24 in the pump Q so that the first section of the pump Q forces liquid into its pressure chamber 20, from whence it is conveyed to the motor N and operates the latter to drive the propeller S' in unison with the propeller S. As the first sections of the pumps only supply a small volume of liquid, the motors will operate at a very slow speed. As the lever 94 engages the successive contacts, $j, k, l, m$, the electro-magnets $P^2, P^3, P^4$ and $P^5$ are successively energized to effect the operation of the corresponding pump sections and thereby gradually increase the volume of fluid delivered by the pump and bring the motor M up to full speed. The motor N is accelerated and brought up to speed simultaneously with the motor M. If it is desired to propel the boat at an intermediate speed, the lever 90 is brought to a corresponding position so that only a portion of the electro-magnets are energized. It will thus be seen, by simply moving the lever 90 between a central and left-hand position, any desired speed may be maintained, or the speed varied as desired. To propel the boat backward the lever 90 is moved to the right, thereby moving the levers 94 and 94' also to the right; the lever 94 first engages the contact $h'$ and establishes a circuit from the brush 82 to the lever 94 and through the contact $h'$, conductor 116, winding of electro-magnet $V^2$ and conductor 113 to the brush 83. The magnet $V^2$ is therefore energized and moves the valve member 62 of the reversing valve V to the right. The continued movement of the lever 94 to the right establishes circuits through the contacts $i', j', k', l'$ and $m'$, and the corresponding electro-magnets P', etc., so that the motor M is started and accelerated in a backward direction. The motor N is also started and accelerated in the same manner as the lever 94' successively engages the contacts $n', o', p', q', r'$ and $s'$.

The relative speed of the motors M and N may be varied as follows:—We will assume in the first place that the lever 90 has been moved to the left until the lever 94 is in engagement with the contacts $h, i, j, k$, and the lever 94' engages the contacts, $n, o, p, q$, and that the lever 90 is locked in said position by the latch 91 engaging the rack teeth 88. The motors M and N will now operate in a forward direction at the same intermediate speed. To vary the speed of the motor M alone, the lever 94 is now operated independently of the lever 90. The centering springs 103 permit this independent movement, the arc shaped member 97 being locked against movement. If the lever 94 is moved farther to the left so as to engage the contacts $l$ and $m$, the motor M is brought up to full speed; if the lever 94 is moved toward central position, the speed of the motor M is decreased; by moving the lever 94 to the right beyond central position, the motor M may be operated backward so that the propellers S and S' may rotate in reverse directions. By thus varying the relative speeds of the propellers or operating them in reverse directions, the boat may be readily steered. As soon as the operator lets go of the lever 94 it will be returned to its former position by the centering springs. The controller $K^2$ may in like manner be used to vary the speed of the motor N by moving the lever 94' while the main lever 90 is locked. The levers 94 and 94' may also both be operated at the same time and independently of each other to independently attain any desired variations in the speeds of the motors, or to control their direction of operation. Ordinarily, the speed of the boat either in a forward or backward direction, will be controlled by the lever 90 and the steering of the boat effected by operating either or both of the controllers K' and $K^2$.

It will be seen that with the present invention, the operation of the boat is under the complete control of one person, and that the speed may be varied and the steering of the boat controlled without the operator changing his position. As the controlling mechanism is operated electrically, the manual labor required to operate the steering apparatus is reduced to a minimum. The present invention also provides means for readily controlling the speed of the boat without the use of the usual clutch mechanism or other expedients which are ordinarily resorted to when gasolene or other internal combustion engines are used.

Although I have shown a form of motor in which oscillating cylinders with reciprocating pistons are used, it will be understood that various other forms of fluid motors might be used. The forms of pumps used might also be varied within wide limits; other forms of rotary pumps for example, might be used, or pumps having oscillating cylinders and reciprocating pistons, similar to the fluid motors herein disclosed, might be used. It is to be further noted that although an electric generator G driven from the engine E is used to supply power for operating the various controlling valves, other forms of power might be used; for example, a fluid motor might be used, and the valves operated by fluid pressure supplied therefrom.

The present invention has been particularly disclosed in connection with the operation and control of a boat, as it is well adapted therefor, but it is to be understood that the principles of the invention are applicable for a wide variety of uses; for example, the invention might be used in the operation of elevators in which the drive sheaves might be placed on the motor shafts, and a system of ropes employed to operate the elevator car by means of the differential action of the drive sheaves. The invention might also be applied to operate differential gearing, or controlling the rudders on ships.

I wish further not to be limited to the particular features of construction herein disclosed, as various changes in the details of construction and arrangements of parts might be made by those skilled in the art, without departing from the spirit and scope of the invention.

What I claim as new and desire to secure to Letters Patent of the United States, is:—

1. In power transmitting mechanism, the combination with pumping mechanism and operating means therefor, of a plurality of motors, separate means for conveying liquid from the pumping mechanism to the several motors, and controlling mechanism operable to vary the relative amount of liquid delivered to the motors.

2. In power transmitting mechanism, the combination with pumping mechanism and driving means therefor, of fluid operated motors, means for supplying fluid under pressure from the pumping mechanism to the motors independently, and means to vary the relative amounts of liquid delivered to the motors from the pumping mechanism and thereby vary the relative speeds of the motors.

3. In power transmitting mechanism, the combination with a prime mover, of a pumping system operated thereby, motors operated independently by liquid delivered by the pumping system, means to convey liquid from the pumping mechanism to the motors independently and controlling mechanism for effecting the delivery of liquid to the motors either in equal or unequal quantities.

4. The combination with a prime mover, of a plurality of pumps operated thereby, fluid motors, means for conveying fluid from the pumps to the motors independently, and means for controlling the volume of liquid delivered to the motors, and thereby effecting their operation at either equal or unequal speeds.

5. The combination with a prime mover, of a plurality of fluid motors, means operated by the prime mover to supply fluid under pressure, means to convey the fluid independently to the motors, and controlling mechanism operable to vary the relative volume of fluid delivered to the motors.

6. The combination with a prime mover, of fluid motors operable in unison in the same direction, means driven by the prime mover for supplying fluid under pressure, means to convey the fluid independently to said motors and thereby securing such operation, and controlling mechanism operable to effect a differential action of the motors.

7. The combination with a plurality of fluid motors, normally operable in unison and at the same speed, means to supply an operating fluid to the motors independently for thus operating the motors, and mechanism operable to vary the relative speeds of the motors to any desired degree within predetermined limits.

8. The combination with a plurality of fluid motors, of means for operating the motors in unison, and controlling mechanism operable to vary the speed of said motors either singly or together.

9. The combination with motors operable by fluid pressure, of pumping mechanism for supplying fluid pressure to the motors and thereby operating them in unison, mechanism operable to slow down, stop, and accelerate in the reverse direction one of said motors independently of the other, and a controlling device controlling said pumping mechanism to regulate the supply of fluid to both motors.

10. The combination with a plurality of motors operable by fluid pressure, of pumping mechanism for supplying fluid pressure to the motors, a speed controlling mechanism operable to slow down, stop, and accelerate in the reverse direction either one of the motors without substantially varying the speed of the other motors, and a device for simultaneously varying the speed of both motors.

11. The combination with a plurality of pumps, of devices operable by liquid under pressure, separate means for conveying liquid from the pumps to said devices, mechanism for varying the relative rates at which liquid is supplied to said devices, and a single device for operating said mechanism.

12. The combination with separate liquid circulating systems, of mechanism operable by the circulation of liquid in said systems, and a system of control operable to vary the circulation of liquid in either one or both of said systems singly or together and thereby control the operation of said mechanism.

13. The combination with a driving member, of a plurality of driven members, power transmitting mechanism interposed between the driving and driven members and comprising pumping mechanism and motors operated by fluid transmitted from the pumping mechanism, means for directing fluid from the pumping mechanism to the motors independently, means to vary the amount of fluid delivered to the motors and thereby vary the speed of the driven members, and a manually operable device to differentially control the relative speed of said motors.

14. The combination with a driving member, of a plurality of driven members, power transmitting mechanism interposed between the driving and driven members, said mechanism comprising pumping mechanism and motors operated by fluid transmitted from the pumping mechanism, said motors being separately connected to the driven members, and means for independently controlling the speed and direction of rotation of the motors.

15. The combination with a prime mover, of pumps connected thereto, motors, separate devices for conveying liquid from the pumps to the motors to operate the latter, reversing valves associated with said devices, and means for independently operating the reversing valves.

16. The combination with an internal combustion engine operable at a practically constant speed, of pumps driven thereby, motors operable by fluid delivered by the pumps, means for independently varying the pumping capacities of the pumps and thereby varying the relative speeds of the motors, and a device for varying the capacities of both pumps.

17. The combination with a prime mover, of a plurality of pumps operated thereby, mechanism operated by fluid delivered by the pumps, electro-magnetic devices associated with the pumps for controlling their output, an electric generator connected to be driven by the prime mover, circuits and connections for supplying current from said generator to said electro-magnetic devices, and means for controlling said circuits.

18. The combination with a plurality of gear pumps and operating means therefor, of a casing inclosing the pumps and forming a common supply chamber therefor, and separate pressure chambers for the pumps.

19. The combination with motors operable by fluid under pressure, of a casing inclosing the motors, means for supplying fluid under pressure to said motors from separate sources, means for varying the relative supply of fluid to the motors and a common discharge pipe for the motors.

20. The combination with pumps having a common supply chamber, of motors operable by liquid delivered by the pumps, separate and independent passages for conveying liquid under pressure from the pumps to the motors, a common return passage for conveying liquid from the discharge sides of the motors to said supply chamber, and means to vary the relative output of the pumps and thereby differentially vary the speed of the motors.

21. The combination with a prime mover, of a plurality of pumps connected to be driven thereby, each of said pumps comprising a plurality of sections, motors operable by fluid delivered by the pumps, mechanism operable to render any desired number of said sections of each pump effective to pump liquid to the motors, and a device for operating said mechanism at will to differentially vary the speed of the motors.

22. The combination with a plurality of motors, of means for supplying fluid pressure to the motors, and a controlling device operable to vary the speed of said motors either simultaneously or separately.

23. The combination of a plurality of motors, means for supplying fluid pressure to the motors, and a controlling device associated with said motors and manually operable to effect a variation in the speed of the motors either in unison or of either motor independently.

24. The combination with a plurality of fluid motors, of pumping apparatus, electromagnetic mechanism associated with each motor and operable to vary the speed of said motor, and controlling means operable manually to effect the operation of said mechanisms either simultaneously or independently at the will of the operator.

25. The combination with a plurality of fluid operated motors and mechanism operated thereby, of separate means for supplying fluid to the motors, devices for regulating and controlling the supply of fluid to each motor, and controlling mechanism for effecting the operation of said devices for the motors either in unison or independently.

26. The combination with a plurality of pumps, of power transmitting mechanism operated by fluid pressure supplied by the pumps, electro-responsive mechanism associated with each pump for varying its output, and controlling means operable to effect the operation of said electro-responsive mechanism either for one pump alone or for the plurality of pumps in unison.

27. The combination with fluid motors, of pumping mechanism, controllers, a device for operating the controllers together, and means for operating either of the controllers alone.

28. The combination with pumping mechanism, of fluid motors, controllers each comprising a series of electrical contacts and a contact member movable into engagement with said contacts successively, a device operable to move said contact members in unison, and means for moving either of said contact members independently of the other.

29. The combination with fluid motors, of pumps, means for controlling the circulation of liquid in the pumps, a pair of controllers each comprising a series of stationary contacts and a contact lever movable into engagement with the contacts successively, a master lever, and connection between the master lever and said contact levers for moving the latter in unison, but permitting an independent movement of either of the contact levers.

30. The combination with means for generating fluid pressure, of mechanism operated thereby, a pair of electrical controllers each comprising a series of stationary contacts and a contact lever movable into engagement with the contacts successively, a master lever, elastic connections between the master lever and said contact levers for operating the latter in unison when the master lever is operated but permitting independent movement of the contact levers, and means for locking the master lever in adjusted positions.

31. The combination with pumping mechanism, of motors operable by fluid delivered by the pump, means for varying the rate at which liquid is delivered to the motors, and means for differentially varying the speed of the motors.

In testimony whereof, I have signed my name to this specification in the presence of two subscribing witnesses.

AUGUST SUNDH.

Witnesses:
 JAMES G. BETHELL,
 JOHN F. RULE.